United States Patent
Hu et al.

(10) Patent No.: US 11,064,186 B2
(45) Date of Patent: Jul. 13, 2021

(54) DISPLAY MODULE, DISPLAY DEVICE AND WORKING METHOD THEREOF

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Guiguang Hu, Beijing (CN); Junxiang Lu, Beijing (CN); Shaojun Sun, Beijing (CN); Xuefang Ye, Beijing (CN); Tan Li, Beijing (CN); Chengjun Liu, Beijing (CN); Junyao Yin, Beijing (CN); Xiangdong Lin, Beijing (CN); Yanfei Chi, Beijing (CN); Xia Chen, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/649,577

(22) PCT Filed: Mar. 22, 2019

(86) PCT No.: PCT/CN2019/079215
§ 371 (c)(1),
(2) Date: Mar. 20, 2020

(87) PCT Pub. No.: WO2019/237787
PCT Pub. Date: Dec. 19, 2019

(65) Prior Publication Data
US 2020/0296353 A1    Sep. 17, 2020

(30) Foreign Application Priority Data

Jun. 12, 2018 (CN) .......................... 201810601325.3

(51) Int. Cl.
*H04N 13/32* (2018.01)
*H04N 13/373* (2018.01)
(Continued)

(52) U.S. Cl.
CPC ............. *H04N 13/32* (2018.05); *G02B 30/36* (2020.01); *G02F 1/133504* (2013.01); *H04N 13/373* (2018.05); *H04N 2213/001* (2013.01)

(58) Field of Classification Search
CPC ................. H04N 13/32; H04N 13/373; H04N 2213/001; G02B 30/36; G02F 1/133504
See application file for complete search history.

(56) References Cited

U.S. PATENT DOCUMENTS

2011/0037836 A1    2/2011 Chang
2016/0033778 A1*   2/2016 Lin ..................... H04N 13/31
                                                       359/462
(Continued)

FOREIGN PATENT DOCUMENTS

CN    101995692 A    3/2011
CN    202494831 U    10/2012
(Continued)

OTHER PUBLICATIONS

First Office Action for Chinese Application No. 201810601325.3, dated Aug. 28, 2019, 9 Pages.
(Continued)

*Primary Examiner* — Thai Q Tran
*Assistant Examiner* — Jose M Mesa
(74) *Attorney, Agent, or Firm* — Brooks Kushman P.C.

(57) ABSTRACT

A display module, a display device and a working method are provided. The display module includes a display panel; a grating structure, arranged on the light-emitting side of the display panel; a deformation unit, located between the display panel and the grating structure; a control circuit,
(Continued)

configured to control the deformation unit to adjust a thickness of the deformation unit in a direction from the display panel to the grating structure to change a distance between the display panel and the grating structure.

14 Claims, 2 Drawing Sheets

(51) Int. Cl.
    *G02B 30/36*     (2020.01)
    *G02F 1/1335*     (2006.01)

(56) References Cited

U.S. PATENT DOCUMENTS

| | | | | |
|---|---|---|---|---|
| 2016/0377939 | A1* | 12/2016 | Yang | G06F 3/0446 345/174 |
| 2017/0003737 | A1* | 1/2017 | Wang | G06F 1/1601 |
| 2017/0150132 | A1* | 5/2017 | Tian | H04N 13/373 |
| 2017/0219837 | A1 | 8/2017 | Gai et al. | |
| 2018/0039369 | A1* | 2/2018 | Liu | G06F 3/045 |

FOREIGN PATENT DOCUMENTS

| | | |
|---|---|---|
| CN | 103581649 A | 2/2014 |
| CN | 203838470 U | 9/2014 |
| CN | 104932111 A | 9/2015 |
| CN | 105093544 A | 11/2015 |
| CN | 205942119 U | 2/2017 |
| CN | 108152982 A | 6/2018 |
| CN | 108828785 A | 11/2018 |
| JP | 2012242443 A | 12/2012 |
| WO | 2017041079 A1 | 3/2017 |

OTHER PUBLICATIONS

International Search Report and Written Opinion for Application No. PCT/CN2019/079215, dated Jun. 24, 2019, 11 Pages.

* cited by examiner

DISPLAY MODULE, DISPLAY DEVICE AND WORKING METHOD THEREOF

CROSS-REFERENCE TO RELATED APPLICATIONS

This application is the U.S. national phase of PCT Application No. PCT/CN2019/079215 filed on Mar. 22, 2019, which claims priority to Chinese Patent Application No. 201810601325.3 filed on Jun. 12, 2018, which are incorporated herein by reference in their entireties.

TECHNICAL FIELD

The present disclosure relates to the field of display technology, and in particular to a display module, a display device and a working method thereof.

BACKGROUND

With the rapid development of stereoscopic display technology, there has been an increasing demand for stereoscopic display devices. Among the many technologies that realize three-dimensional stereoscopic display, the naked-eye stereoscopic display is favored in the field of three-dimensional stereoscopic display because it does not require the viewer to wear glasses.

The naked-eye 3D display device in the related art comprises a display panel and a grating structure located on a light-emitting side of the display panel, but the optimal viewing position of the naked-eye 3D display device in the related art is fixed. When the viewer is not in the optimal viewing position, the image being viewed will be ghosted, affecting the viewing experience of the viewer.

SUMMARY

On one hand, a display module is provided in an embodiment of the present disclosure, including: a display panel; a grating structure on a light-emitting side of the display panel; a deformation unit between the display panel and the grating structure; and a control circuit, configured to control the deformation unit to adjust a thickness of the deformation unit in a direction from the display panel to the grating structure to change a distance between the display panel and the grating structure.

Further, the deformation unit includes an electro-deformation unit; a thickness of the electro-deformation unit in the direction from the display panel to the grating structure changes under an action of an electric field, to change the distance between the display panel and the grating structure.

Further, the electro-deformation unit includes: a first electrode and a second electrode opposite to each other; an electroactive polymer material between the first electrode and the second electrode; where an electrical signal is applied to the first electrode and the second electrode, to control a change in a thickness of the electroactive polymer material in the direction from the display panel to the grating structure.

Further, the first electrode and the second electrode are made of a transparent conductive material; the electroactive polymer material is an electronic electroactive polymer material and/or an ionic electroactive polymer material.

Further, the electroactive polymer material is an all-organic composite material or a composite material of a metal-organic complex Copper Phthalocyanine and (VDF-TrFE) with a dielectric constant greater than a preset threshold.

Further, an orthographic projection of the deformation unit onto the display panel is within a non-display area of the display panel.

Further, the orthographic projection of the deformation unit onto the display panel surrounds a display area of the display panel.

Further, the deformation unit is of a rectangular frame-like shape.

Further, the deformation unit has a stripe-like shape and is disposed on opposite sides of the display area; or the deformation unit is of a block-like shape and is evenly distributed in the non-display area.

Further, the deformation unit includes a magneto-deformation unit; a thickness of the magneto-deformation unit in a direction from the display panel to the grating structure changes under an action of a magnetic field, to change the distance between the display panel and the grating structure.

Further, the magneto-deformation unit includes two electrodes opposite to each other and a magnetostrictive material between the two electrodes; an intensity of the magnetic field between the two electrodes is controlled by controlling a magnitude of an alternating current signal applied to the two electrodes, to control the magnetostrictive material to adjust a thickness of the magnetostrictive material in the direction from the display panel to the grating structure, to change the distance between the display panel and the grating structure.

Further, the deformation unit is sandwiched between the display panel and the grating structure.

Further, deformation unit is in direct contact with the display panel; the deformation unit is in direct contact with the grating structure.

A display device is further provided in an embodiment of the present disclosure, including the display module hereinabove.

Further, the display device further includes: a detecting circuit, configured to detect a distance between a viewer and the display circuit; a processing circuit, configured to control, based on the detected distance, the thickness of the deformation unit in the direction from the display panel of the display module to the grating structure of the display module.

Further, detecting circuit is an infrared sensor on the grating structure of the display module.

Further, the deformation unit is an electro-deformation unit, and the processing circuit includes:
a calculation circuit, configured to calculate a distance h from the display panel to the grating structure according to a formula $h/L=p/T$, where L is a distance from a viewer to the grating structure, p is a pixel width of the display panel, and T is a pupillary distance of the viewer;
a control circuit, configured to control an electric field applied to the electro-deformation unit, to make the distance between the display panel and the grating structure to be h.

Further, the deformation unit is a magneto-deformation unit, the magneto-deformation unit includes two electrodes opposite to each other and a magnetostrictive material between the two electrodes;
the processing circuit includes:
a calculation circuit, configured to calculate a distance h from the display panel to the grating structure according to a formula $h/L=p/T$, where L is a distance from the viewer to the grating structure, p is a pixel width of the display panel, and T is a pupillary distance of the viewer;

a control circuit, configured to control a magnitude of an alternating current signal applied to the two electrodes of the magneto-deformation unit to control an intensity of a magnetic field between the two electrodes, to control the magnetostrictive material to adjust the thickness of the magnetostrictive material in the direction from the display panel to the grating structure, to make the distance between the display panel and the grating structure to be h.

A working method of display device is further provided in an embodiment of the present disclosure, applying to the display device hereinabove, including:

detecting a distance between a viewer and the display module in the display device;

controlling a thickness of the deformation unit in the display device according to the detected distance.

Further, the deformation unit is an electro-deformation unit, the controlling the thickness of the deformation unit in the display device according to the detected distance includes:

calculating a distance h from the display panel to the grating structure according to a formula $h/L=p/T$, where L is a distance from the viewer to the grating structure, p is a pixel width of the display panel, and T is a pupillary distance of the viewer;

controlling an electric field applied to the electro-deformation unit, to make the distance between the display panel and the grating structure to be h.

Further, the deformation unit in the display device is a magneto-deformation unit, the magneto-deformation unit includes two electrodes opposite to each other and a magnetostrictive material between the two electrodes;

the controlling the thickness of the deformation unit according to the detected distance includes:

calculating a distance h from the display panel to the grating structure according to a formula $h/L=p/T$, where L is a distance from the viewer to the grating structure, p is a pixel width of the display panel, and T is a pupillary distance of the viewer;

controlling a magnitude of an alternating current signal applied to the two electrodes of the magneto-deformation unit to control an intensity of a magnetic field between the two electrodes, to control the magnetostrictive material to adjust the thickness of the magnetostrictive material in the direction from the display panel to the grating structure, to make the distance between the display panel and the grating structure to be h.

DETAILED DESCRIPTION

To describe the objective, the technical solutions and the advantages of embodiments of the present disclosure more clearly, the technical solutions in embodiments of the present disclosure are described clearly and completely in conjunction with drawings in the embodiments of the present disclosure.

Figure 1:
FIG. 1 is a schematic structural diagram of a naked-eye 3D display device in the related art.

As shown in FIG. 1, the naked-eye 3D display device in the related art includes a display panel 1 and a grating structure 3 located on a light-emitting side of the display panel 1, a spacer layer 2 having a fixed thickness is spaced between the display panel 1 and the grating structure 3, that is, the distance between the display panel 1 and the grating structure 3 is fixed. In this way, the optimal viewing position of the naked-eye 3D display device is also fixed, and there will be a problem of reverse vision, that is, if the viewer is not in the optimal viewing position, the viewed image will be ghosting, and then the viewing experience of the viewer may be affected.

In view of this, a display module, a display device, and a working method thereof are provided in some embodiments of the present disclosure, which can improve the viewing effect of a naked eye 3D display device.

A display module is provided in some embodiments of the present disclosure, including a display panel and a grating structure disposed on a light-emitting side of the display panel, the display module further includes:

a deformation unit located between the display panel and the grating structure and maintaining a distance between the display panel and the grating structure, and the thickness of the deformation unit may be changed to change the distance between the display panel and the grating structure; a control circuit, configured to control the thickness of the deformation unit.

In this embodiment, a deformation unit is disposed between the display panel and the grating structure, and the deformation unit is configured to maintain the distance between the display panel and the grating structure, where the thickness of the deformation unit may be changed to change the distance between the display panel and the grating structure. In this way, the thickness of the deformation unit may be controlled according to the position of the viewer, the distance between the display panel and the grating structure may be adjusted, and then the optimal viewing position may be adjusted, thereby solving the image crosstalk caused by reverse vision and improving the viewing experience of the viewer.

The display panel may be a liquid crystal display panel or an OLED display panel, and may also be another type of display panel. The grating structure may include a substrate and a plurality of light-shielding stripes arranged in parallel on the substrate. The light-shielding stripes may be made of a black light-shielding material, for example, the light-shielding stripes may be made of a black matrix material. The display panel, the deformation unit and the grating structure may be bonded by frame sealing process or using optical glue.

When the display module is displaying, when the image that should be seen by the viewer's left eye is displayed on the display panel, the light-shielding stripes will block the viewer's right eye; similarly, when the image that should be seen by the viewer's right eye is displayed on the display panel, the light-shielding stripes will block the viewer's left eye. By separating the visible images of the left and right eyes, the viewer may see the 3D image.

The deformation unit may be deformed under the control of a control field. The control field includes, but is not limited to, an electric field and a magnetic field. The deformation unit may include an electro-deformation unit and/or a magneto-deformation unit.

Under an action of an electric field, the size of the electro-deformation unit may be changed, and then the thickness thereof may be changed, thereby changing the distance between the display panel and the grating structure.

Under an action of a magnetic field, the size of the magneto-deformation unit may be changed, and the thickness thereof may be changed, thereby changing the distance between the display panel and the grating structure.

Of course, the type of the deformation unit is not limited to the electro-deformation unit and the magneto-deformation unit, other types of deformation units may also be used, as long as the deformation unit may be deformed under the control of the control field.

The magneto-deformation unit may include two electrodes disposed opposite to each other and a magnetostrictive material disposed between the electrodes. When an alternating current signal is applied to the electrodes, a magnetic field may be generated between the two electrodes. The intensity of the magnetic field may be controlled by controlling the applied electrical signal, so as to control the size of the magnetostrictive material. Therefore, the thickness thereof is changed, and then the distance between the display panel 1 and the grating structure 3 is changed, so that the change of the magnetic field may be controlled according to the position of the viewer to control the size of the magneto-deformation unit, the distance between the display panel 1 and the grating structure 3 may be adjusted, and then the optimal viewing position may be adjusted, thereby solving the image crosstalk in reverse vision and improving the viewing experience of the viewer.

Figure 2:
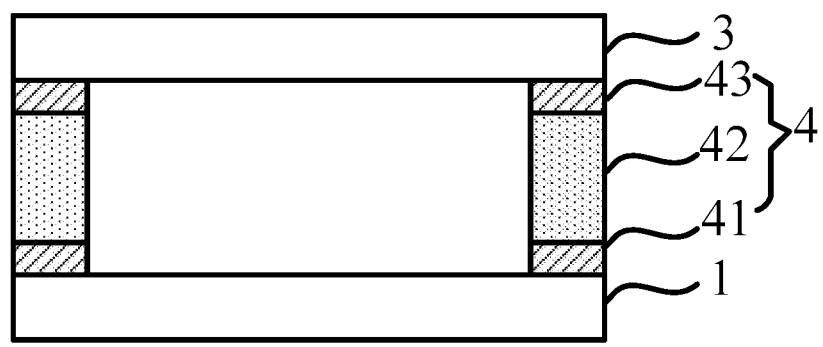
FIG. 2 is a schematic structural diagram of a naked-eye 3D display device in some embodiments of the present disclosure.

In a specific embodiment, when the deformation unit is an electro-deformation unit, as shown in FIG. 2, the display module includes a display panel 1 and a grating structure 3 disposed on a light-emitting side of the display panel 1. The display module further includes an electro-deformation unit 4 located between the display panel 1 and the grating structure 3. The electro-deformation unit 4 may maintain the distance between the display panel 1 and the grating structure 3. Under the control of the electric field, the size of the electro-deformation unit 4 changes, so that the distance between the display panel 1 and the grating structure 3 changes. In this way, the change of the electric field may be controlled according to the position of the viewer, so as to control the electro-deformation unit. 4 size, the distance between the display panel 1 and the grating structure 3 may be adjusted, and the optimal viewing position may be adjusted, thereby solving the image crosstalk appearing in reverse vision, and improving the viewing experience of the viewer.

Further, as shown in FIG. 2, the electro-deformation unit 4 includes: a first electrode 41 and a second electrode 43, disposed opposite to each other;

an electroactive polymer material 42, located between the first electrode 41 and the second electrode 43;

an electrical signal is applied to the first electrode 41 and the second electrode 43, to controls a change of a thickness of the electroactive polymer material 42.

In order not to affect the display, the first electrode 41 and the second electrode 43 may be made of transparent conductive materials, such as ITO, IZO, and graphene. The electroactive polymer material may be an electronic electroactive polymer material and/or an ionic electroactive polymer material. When subjected to an electric field, the electronic electroactive polymer material and the ionic electroactive polymer material may rapidly deform.

Optionally, the electroactive polymer material is an all-organic composite material or a composite material of a metal-organic complex Copper Phthalocyanine (CuPc) and P (VDF-TrFE) with a dielectric constant greater than a preset threshold.

To prevent the deformation unit from affecting the light emitted from the display panel, optionally, an orthographic projection of the deformation unit onto the display panel falls into a non-display area of the display panel.

Figure 3:
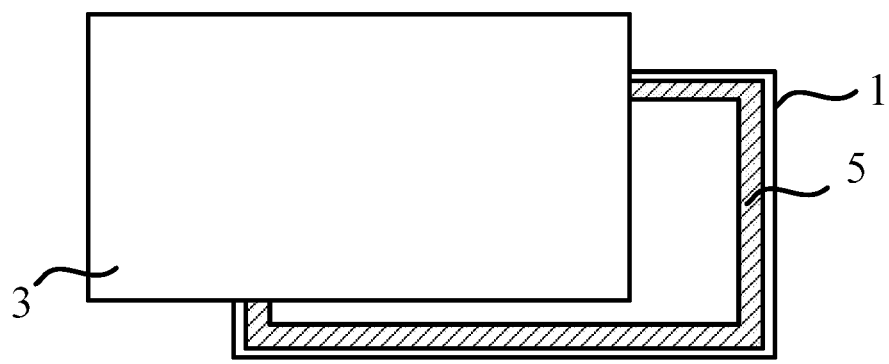
FIG. 3-FIG. 5 are schematic plan views of a naked-eye 3D display device in some embodiments of the present disclosure.

Further, in order to make the deformation unit well maintain the distance between the display panel and the grating structure, as shown in FIG. 3, the deformation unit 5 is of a rectangular frame-like shape, and the orthographic projection of the deformation unit 5 on the display panel 1 surrounds the display area of the display panel 1. Of course, the deformation unit 5 is not limited to a rectangular frame-like shape, and other shapes, such as a stripe-like shape or a block-like shape, may also be adopted, as long as the distance between the display panel 1 and the grating structure 3 may be maintained.

Figure 4:
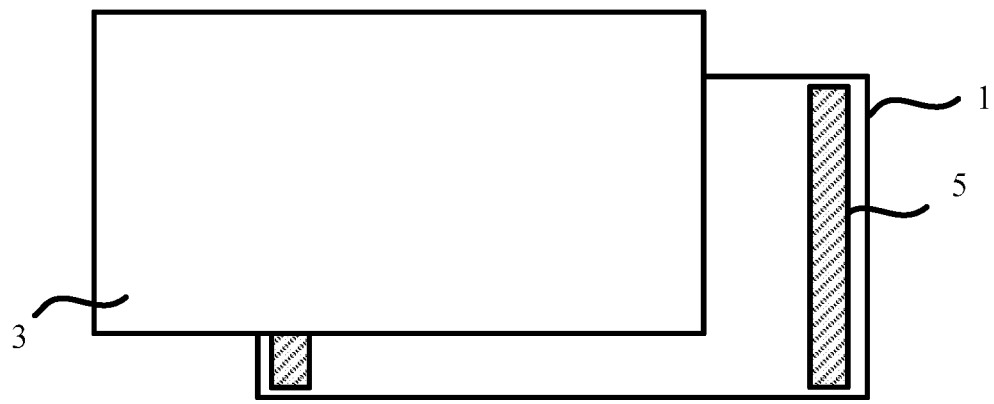

As shown in FIG. 4, the deformation units 5 are of a stripe-like shape and is disposed on opposite sides of the display area of the display panel 1. For example, the deformation units 5 may be disposed on the upper and lower sides and/or the left and right sides of the display area.

Figure 5:
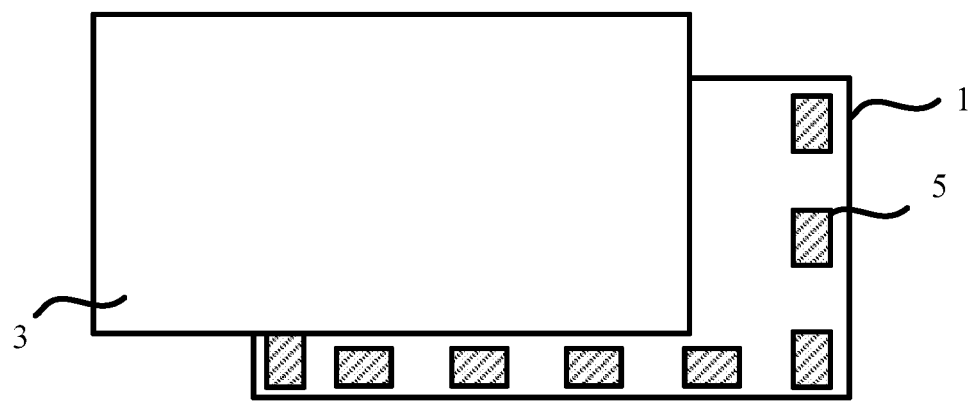

As shown in FIG. 5, The deformation units 5 are of a block-like shape and are evenly distributed between the display panel 1 and the grating structure 3. In order not to affect the display effect, the deformation units 5 are distributed in the non-display area of the display panel 1. In order to effectively maintain the distance between the display panel 1 and the grating structure 3, the deformation units 5 are evenly distributed.

A display device is further provided in an embodiment of the present disclosure, including the display module as described above.

According to the display device of this embodiment, a deformation unit is disposed between the display panel and the grating structure, and the deformation unit is configured to maintain the distance between the display panel and the grating structure, where the thickness of the deformation unit may be changed to change the distance between the display panel and the grating structure, so that the distance between the viewer and the display module may be detected, the thickness of the deformation unit may be controlled according to the detected distance, and the distance between the display panel and the grating structure may be adjusted, then the optimal viewing position may be adjusted, thereby solving the image crosstalk that occurs in reverse vision, and improving the viewing experience of the viewer.

The display device may be any product or component having a display function, such as a liquid crystal television, a liquid crystal display, a digital photo frame, a mobile phone, and a tablet computer, where the display device further includes a flexible circuit board, a printed circuit board, and a back plate.

Further, the display device also includes:

a detecting circuit, configured to detect a distance between a viewer and the display module;

a processing circuit, configured to control the thickness of the deformation unit according to the detected distance.

Specifically, the detecting circuit is an infrared sensor disposed on a grating structure of the display module. The position of the viewer is detected by infrared. Of course, the detection module is not limited to the infrared sensor, an image acquisition unit such as a camera may also be used, as long as the distance between the viewer and the display module may be obtained.

After a lot of practical verifications, when the distance between the viewer and the grating structure is L, the distance between the display panel and the grating structure is h, so that the viewer can obtain a better viewing experience, where the relationship between L and h satisfies the formula: h/L=p/T, where p is the pixel width of the display panel, T is the pupillary distance of the viewer. Therefore, when the display device performs display, the distance h between the display panel and the grating structure may be adjusted according to this formula, so that the viewer can obtain a better viewing experience.

Further, when the deformation unit is an electro-deformation unit, the processing circuit includes:

a calculation circuit, configured to calculate a distance h from the display panel to the grating structure according to the formula h/L=p/T, where L is the distance from the viewer to the grating structure, p is the pixel width of the display panel, T is the pupillary distance of the viewer;

a control circuit, configured to control an electric field applied to the electro-deformation unit, so that the thickness of the electro-deformation unit changes, satisfy that a distance between the display panel and the grating structure is h, thereby, the viewer has a better viewing experience.

A working method of display device is further provided in some embodiments of the present disclosure, applied to a display device as described above, the working method including:

detecting a distance between a viewer and a display module;

controlling a thickness of the deformation unit according to the detected distance.

According to this embodiment, a deformation unit is disposed between the display panel and the grating structure of the display device, and the deformation unit is configured to adjust and maintain the distance between the display panel and the grating structure. The thickness of the deformation unit may be changed to change the distance between the display panel and the grating structure, so that the distance between the viewer and the display module may be detected, the thickness of the deformation unit may be controlled according to the detected distance, and the distance between the display panel and the grating structure may be adjusted, the optimal viewing position is adjusted, thereby solving the image crosstalk that occurs in reverse vision, and improving the viewing experience of the viewer.

The display device may be any product or component having a display function, such as a liquid crystal television, a liquid crystal display, a digital photo frame, a mobile phone, and a tablet computer. The display device further includes a flexible circuit board, a printed circuit board, and a back plate.

Specifically, the position of the viewer may be detected by an infrared sensor on the grating structure of the display module. Of course, the position of the viewer can also be detected by other methods, such as the position of the viewer by image acquisition.

After a lot of practical verifications, when the distance between the viewer and the grating structure is L, the distance between the display panel and the grating structure is h, so that the viewer can obtain a better viewing experience, where the relationship between L and h satisfies the formula is h/L=p/T, where p is the pixel width of the display panel, and T is the pupillary distance of the viewer. Therefore, when the display device performs display, the distance h between the display panel and the grating structure may be adjusted according to this formula, so that the viewer can obtain a better viewing experience.

Further, when the deformation unit is an electro-deformation unit, the controlling the thickness of the deformation unit according to the detected distance includes:

calculating the distance h from the display panel to the grating structure according to the obtained L and the formula h/L=p/T, where L is the distance from the viewer to the grating structure, and p is the pixel width of the display panel, T is the pupillary distance of the viewer's eyes;

controlling the electric field applied to the electro-deformation unit, so that the thickness of the electro-deformation unit may be changed, satisfy that the distance between the display panel and the grating structure is h, so that the viewer has a better viewing experience.

Unless otherwise defined, the technical or scientific terms used in the present disclosure shall have the ordinary meanings understood by those of ordinary skill in the art to which the present disclosure belongs. The terms "first", "second", and the like used in this disclosure do not indicate any order, quantity, or priority, but are only configured to distinguish different components. Expressions such as "connection" or "connected" are not limited to denote physical or mechanical connections, but may include electrical connections, whether direct or indirect. "Up", "down", "left", "right", etc. are only configured to indicate the relative position relationship. When the absolute position of the described object changes, the relative position relationship changes accordingly.

It will be understood that when an element such as a layer, film, region, or substrate is referred to as being "on" or "under" another element, it may be "directly on" or "under" another element, or there may be intermediate elements.

The above are merely some embodiments of the present disclosure. It should be noted that those of ordinary skill in the art may make further modifications and improvements without departing from the principle of the present disclosure, and these modifications and improvements shall also fall within the scope of the present disclosure.

What is claimed is:

1. A display module, comprising:
   a display panel;
   a grating structure on a light-emitting side of the display panel;
   a deformation unit between the display panel and the grating structure; and
   a control circuit, configured to control the deformation unit to adjust a thickness of the deformation unit in a direction from the display panel to the grating structure, to change a distance between the display panel and the grating structure;
   wherein the deformation unit comprises an electro-deformation unit;
   a thickness of the electro-deformation unit in the direction from the display panel to the grating structure changes under an action of an electric field, to change the distance between the display panel and the grating structure.

2. The display module according to claim 1, wherein the electro-deformation unit comprises:
   a first electrode and a second electrode opposite to each other;
   an electroactive polymer material between the first electrode and the second electrode;
   wherein an electrical signal is applied to the first electrode and the second electrode, to control a change in a thickness of the electroactive polymer material in the direction from the display panel to the grating structure.

3. The display module according to claim 2, wherein the first electrode and the second electrode are made of a transparent conductive material; the electroactive polymer material is an electronic electroactive polymer material and/or an ionic electroactive polymer material.

4. The display module according to claim 3, wherein the electroactive polymer material is an all-organic composite material or a composite material of a metal-organic complex Copper Phthalocyanine and P (VDF-TrFE) with a dielectric constant greater than a preset threshold.

5. The display module according to claim 1, wherein an orthographic projection of the deformation unit onto the display panel is within a non-display area of the display panel.

6. The display module according to claim 5, wherein the orthographic projection of the deformation unit onto the display panel surrounds a display area of the display panel.

7. The display module according to claim 6, wherein the deformation unit is of a rectangular frame-like shape.

8. The display module according to claim 5, wherein the deformation unit has a stripe-like shape and is disposed on opposite sides of the display area; or
the deformation unit is of a block-like shape and is evenly distributed in the non-display area.

9. The display module according to claim 1, wherein the deformation unit is sandwiched between the display panel and the grating structure.

10. The display module according to claim 9, wherein the deformation unit is in direct contact with the display panel; the deformation unit is in direct contact with the grating structure.

11. A display device, comprising a display module, wherein the display module comprises:
a display panel;
a grating structure on a light-emitting side of the display panel;
a deformation unit between the display panel and the grating structure; and
a control circuit, configured to control the deformation unit to adjust a thickness of the deformation unit in a direction from the display panel to the grating structure, to change a distance between the display panel and the grating structure;
wherein the display device further comprises:
a processing circuit, configured to control, based on the detected distance, the thickness of the deformation unit in the direction from the display panel of the display module to the grating structure of the display module;
wherein the deformation unit is a magneto-deformation unit, the magneto-deformation unit comprises two electrodes opposite to each other and a magnetostrictive material between the two electrodes;
the processing circuit comprises:
a calculation circuit, configured to calculate a distance h from the display panel to the grating structure according to a formula $h/L=p/T$, wherein L is a distance from the viewer to the grating structure, p is a pixel width of the display panel, and T is a pupillary distance of the viewer;
a control circuit, configured to control a magnitude of an alternating current signal applied to the two electrodes of the magneto-deformation unit to control an intensity of a magnetic field between the two electrodes, to control the magnetostrictive material to adjust the thickness of the magnetostrictive material in the direction from the display panel to the grating structure, to make the distance between the display panel and the grating structure to be h.

12. The display device according to claim 11, further comprising:
a detecting circuit, configured to detect a distance between a viewer and the display module.

13. The display device according to claim 12, wherein the detecting module is an infrared sensor on the grating structure of the display module.

14. A working method of a display device, applying to the display device, wherein the display device comprises a display module;
wherein the display module comprises:
a display panel;
a grating structure on a light-emitting side of the display panel;
a deformation unit between the display panel and the grating structure; and
a control circuit, configured to control the deformation unit to adjust a thickness of the deformation unit in a direction from the display panel to the grating structure, to change a distance between the display panel and the grating structure;
the working method comprises:
detecting a distance between a viewer and the display module in the display device;
controlling a thickness of the deformation unit in the display device according to the detected distance;
wherein the deformation unit is an electro-deformation unit, the controlling the thickness of the deformation unit in the display device according to the detected distance comprises:
calculating a distance h from the display panel to the grating structure according to a formula $h/L=p/T$, wherein L is a distance from the viewer to the grating structure, p is a pixel width of the display panel, and T is a pupillary distance of the viewer;
controlling an electric field applied to the electro-deformation unit, to make the distance between the display panel and the grating structure to be h;
or,
the deformation unit in the display device is a magneto-deformation unit, the magneto-deformation unit comprises two electrodes opposite to each other and a magnetostrictive material between the two electrodes;
the controlling the thickness of the deformation unit according to the detected distance comprises:
calculating a distance h from the display panel to the grating structure according to a formula $h/L=p/T$, wherein L is a distance from the viewer to the grating structure, p is a pixel width of the display panel, and T is a pupillary distance of the viewer;
controlling a magnitude of an alternating current signal applied to the two electrodes of the magneto-deformation unit to control an intensity of a magnetic field between the two electrodes, to control the magnetostrictive material to adjust the thickness of the magnetostrictive material in the direction from the display panel to the grating structure, to make the distance between the display panel and the grating structure to be h.

\* \* \* \* \*